UNITED STATES PATENT OFFICE.

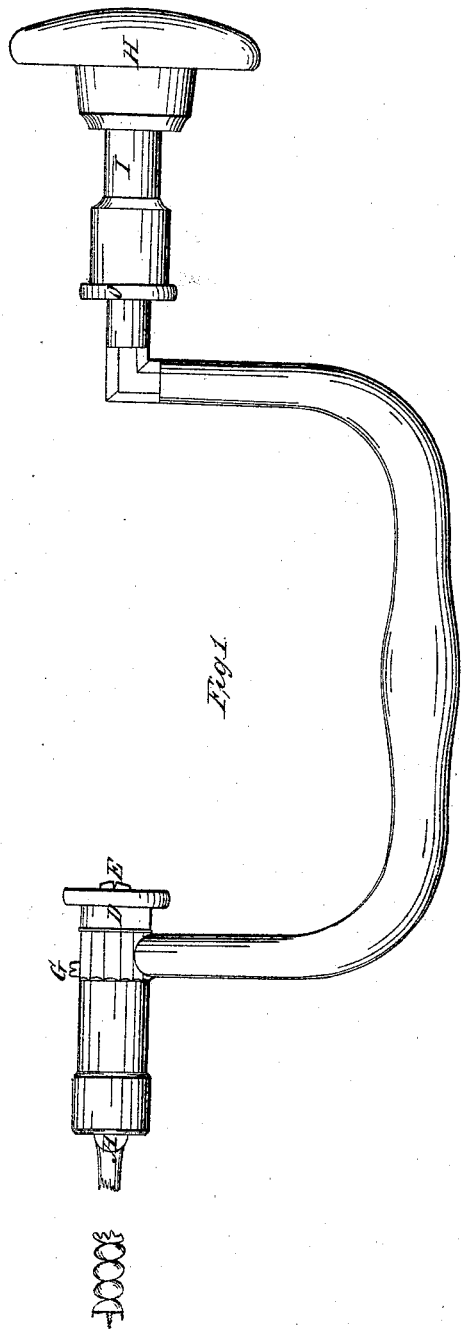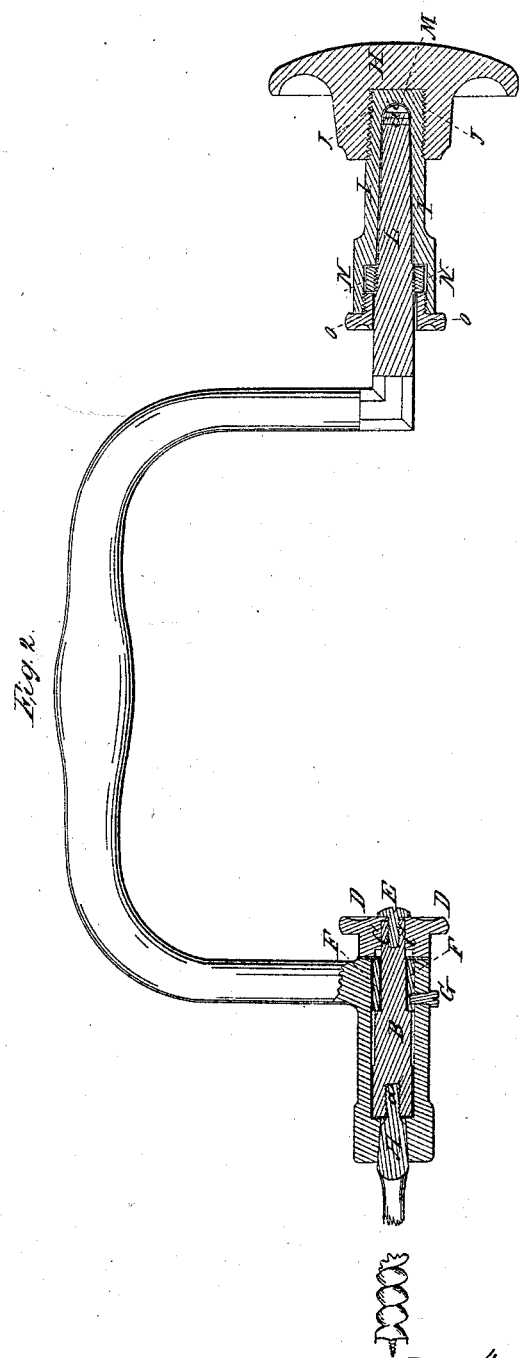

DANIEL N. BAIRD, OF WARRENSVILLE, OHIO, ASSIGNOR TO NATHANIEL POTTER, OF ERIE COUNTY, NEW YORK.

BRACE.

Specification of Letters Patent No. 15,632, dated August 26, 1856.

*To all whom it may concern:*

Be it known that I, DANIEL N. BAIRD, of Warrensville, in the county of Cuyahoga and State of Ohio, have invented certain new and useful Improvements in the Construction of Bit-Stocks; and I do hereby declare that the following is a full and exact description thereof, reference being had to the annexed drawings, making part of this specification.

Figure 1 is a view of the stock entire, Fig. 2 is a sectional view showing the arrangement for holding and releasing the bit, and also the manner of attaching the head to the brace.

Like letters refer to like parts in the two views.

The shank A of the bit, is square, and fits on to the end of the brace in the usual manner; (but they may be formed round if preferred). On the end of the shank is the screw $a$, which screws into the mandrel B; this mandrel is round, except the back end of it, at C, which is made to fit into the thumb piece D, the thumb piece and mandrel are secured in place by the set screw E. It is by means of the thumb piece, that the mandrel B, is turned, thereby securing or releasing the bit to, or from, the brace, as may be required.

To prevent the mandrel from slipping out from the chamber in which it is placed, the ferrule or washer F, is made to slip over the mandrel B, loose enough to allow the mandrel to turn inside of it, and the washer is prevented from moving by the set screw G. By this combination and arrangement, the mandrel is allowed to turn by means of the thumb piece, but cannot slip out from the chamber without removing the set screw G.

Another feature of my improvement, consists in the manner of attaching the head to the brace, viz: The head H, may be made of wood or metal, in the usual form, the shank I is then secured to it, by screwing it into the head, as seen at J, Fig. 2.

In the inside of the shank I, is a chamber for the reception of the spindle L, in which chamber the spindle turns. The end of the spindle forms a center bearing as seen at M, $i\ i\ i$ are 3 friction plates.

The collar N is secured to the spindle outside of which is the thumb nut O, which screws into the chamber on the inside; which gives to the outside, a neat and finished appearance.

By means of the thumb nut O, and collar, N, the head is attached to the brace, as seen in Fig. 2, and may be removed at any time by withdrawing the thumb nut.

What I claim as my improvement, and desire to secure by Letters Patent, is,

1. Inserting the mandrel B, in the chamber in the shank of the brace; this I claim, in combination with the washer F, set screw G, and thumb piece D, arranged in the manner described, and for the purpose herein set forth.

2. The manner of attaching the head of the brace to the spindle L, by means of the thumb nut O, and collar N, this I claim in combination with the chamber which receives the collar and screw of the thumb nut O, in the manner substantially as described and for the purpose specified.

DANIEL N. BAIRD.

Witnesses:
JEHU BRAMEN,
JOHN BARR.